(12) United States Patent
Croxford (10) Patent No.: US 7,734,853 B2
(45) Date of Patent: Jun. 8, 2010

(54) LATENCY DEPENDENT DATA BUS TRANSMISSION

(75) Inventor: Daren Croxford, Cambridgeshire (GB)

(73) Assignee: ARM Limited, Cambridge (GB)

( * ) Notice: Subject to any disclaimer, the term of this patent is extended or adjusted under 35 U.S.C. 154(b) by 41 days.

(21) Appl. No.: 12/081,234

(22) Filed: Apr. 11, 2008

(65) Prior Publication Data

US 2008/0294820 A1   Nov. 27, 2008

Related U.S. Application Data

(63) Continuation-in-part of application No. 11/363,270, filed on Feb. 28, 2006, now Pat. No. 7,565,516.

(51) Int. Cl.
*G06F 13/00* (2006.01)

(52) U.S. Cl. .................. 710/110; 710/35; 710/307; 712/300

(58) Field of Classification Search .............. 710/35, 710/105, 106, 110, 307, 308; 712/300
See application file for complete search history.

(56) References Cited

U.S. PATENT DOCUMENTS

| | | | |
|---|---|---|---|
| 5,574,921 A | 11/1996 | Curran | |
| 6,266,718 B1 * | 7/2001 | Klein | ............... 710/58 |
| 6,529,994 B1 * | 3/2003 | Bleidt et al. | ............ 711/114 |
| 6,583,735 B2 | 6/2003 | Henkel et al. | |
| 7,065,622 B2 * | 6/2006 | Donnelly et al. | ............ 711/167 |
| 7,457,888 B2 * | 11/2008 | Adkisson et al. | .............. 710/14 |
| 2001/0011356 A1 | 8/2001 | Lee et al. | |
| 2006/0010279 A1 * | 1/2006 | Phelps et al. | ................ 710/310 |
| 2006/0026413 A1 | 2/2006 | Ramkumar | |
| 2006/0149874 A1 * | 7/2006 | Ganasan et al. | ............. 710/110 |
| 2007/0005922 A1 | 1/2007 | Swaminathan et al. | |
| 2008/0059667 A1 * | 3/2008 | Berenbaum et al. | ........ 710/110 |

OTHER PUBLICATIONS

Childers et al., *Reordering Memory Bus Transactions for Reduced Power Consumption*, ACM SIGPLAN Workshop on Languages, Compilers, and Tools for Embedded Systems, PLDI'2000, Jun. 2000, 9 pages.

Yang et al., *Frequent Value Encoding for Low Power Data Buses*, ACM Transactions on Design Automation of Electronic Systems, vol. 9, No. 3, Jul. 2004, pp. 354-384.

* cited by examiner

*Primary Examiner*—Glenn A Auve
(74) *Attorney, Agent, or Firm*—Nixon & Vanderhye P.C.

(57) ABSTRACT

In a system where data is transmitted from a source device to a destination device via one or more buses, transmission mode selecting circuitry is provided to select one of a first transmission mode and a second transmission mode for the data in response to a mode selecting signal that indicates a latency requirement of the destination device. When data is sent using the second mode there is a lower latency between the destination device receiving the data and being able to process the data than when the first transmission mode is used.

40 Claims, 6 Drawing Sheets

FIG. 1

(dotted lines indicate alternative locations for TMSC)

Unordered data:

| Transfer | Data sent |
|---|---|
| Beat 1 | Data 0[15:0] |
| Beat 2 | Data 0[31:16] |
| Beat 3 | Data 1[15:0] |
| Beat 4 | Data 1[31:16] |
| Beat 5 | Data 2[15:0] |
| Beat 6 | Data 2[31:16] |
| Beat 7 | Data 3[15:0] |
| Beat 8 | Data 3[31:16] |

FIG. 3B

First mode: (Non-latency critical mode)

| Beat 1 | Data 0[15:0] |
|---|---|
| Beat 2 | Data 1[15:0] |
| Beat 3 | Data 2[15:0] |
| Beat 4 | Data 3[15:0] |
| Beat 5 | Data 0[31:16] |
| Beat 6 | Data 1[31:16] |
| Beat 7 | Data 2[31:16] |
| Beat 8 | Data 3[31:16] |

FIG. 3C

Second mode: (Latency - critical mode)

| Beat 1 | Data 0[15:0] |
|---|---|
| Beat 2 | Data 0[31:16] |
| Beat 3 | Data 1[15:0] |
| Beat 4 | Data 2[15:0] |
| Beat 5 | Data 3[15:0] |
| Beat 6 | Data 1[31:16] |
| Beat 7 | Data 2[31:16] |
| Beat 8 | Data 3[31:16] | or

| Beat 1 | Data 0[15:0] |
|---|---|
| Beat 2 | Data 0[31:16] |
| Beat 3 | Data 1[15:0] |
| Beat 4 | Data 1[31:16] |
| Beat 5 | Data 2[15:0] |
| Beat 6 | Data 2[31:16] |
| Beat 7 | Data 3[15:0] |
| Beat 8 | Data 3[31:16] |

FIG. 6

LATENCY DEPENDENT DATA BUS TRANSMISSION

This application is a Continuation-in-Part of application Ser. No. 11/363,270, filed 28 Feb. 2006, now U.S. Pat. No. 7,565,516. The entire content of application Ser. No. 11/363,270 is incorporated herein by reference.

TECHNICAL FIELD

This field relates to the field of data processing systems. More particularly, the technology described herein relates to controlling transmission across a bus in dependence upon the latency requirements of a destination device.

BACKGROUND

It is known from "Frequent Value Encoding For Low Power Data Buses" Jun Yang et al, Association for Computing Machinery (ACM) Transactions on Design Automation of Electronic Systems, Volume 9, No. 3, July 2004, Pages 354 to 384 to encode data values to be transmitted so as to reduce switching activity on external buses for the purpose of reducing power consumption. However, this technique has the disadvantage that extra circuit resources and power are consumed by first encoding the data values to be transmitted and then subsequently decoding these values. Also, the encoding and decoding of the data values introduces a time delay.

It is known from "Reordering Memory Bus Transactions For Reduced Power Consumption" Bruce R. Childers et al. ACM SIGPLAN Workshop On Languages, Compilers, and Tools for Embedded Systems, during ACM SIGPLAN Conference On Programming Language Design and Implementation (PLDI'2000, June 2000) to examine with hardware the data words within a cache line being transferred to or from memory so as to determine a new order for the data words to be transferred in order to reduce switching activity and accordingly energy consumption. This additional hardware consumes power which detracts from the energy saved by reducing the switching activity on the buses. The additional hardware is also a disadvantageous complexity and cost overhead, and incurs a latency penalty due to the time taken to calculate a new order of transmission.

Thus, both Yang and Childers reduce the power consumed by the bus, but at the expense of latency. In some situations the latency incurred may be unacceptable. It is desirable to produce a system that improves the performance of data transfers over the bus without adversely affecting the latency of the system.

In the present application, the term "bus" is taken to mean a collection of one or more conductors. A bus can be a one-to-one connection, a one-to-many connection, a many-to-one connection, or a many-to-many connection. A bus may or may not connect devices via interconnect circuitry.

SUMMARY

Viewed from one aspect the technology described herein provides an apparatus for processing data, said apparatus comprising:
one or more buses for transmitting data;
a source device coupled to at least one of said one or more buses and configured to send data via said one or more buses;
a destination device coupled to said source device via said one or more buses and configured to receive and to process said data; and transmission mode selecting circuitry coupled to at least one of said source device and said one or more buses and responsive to a mode selecting signal to select one of a first transmission mode for said data and a second transmission mode for said data, said second transmission mode having a lower latency between said destination device receiving said data and being able to process said data than said first transmission mode;
wherein said mode selecting signal is indicative of a latency requirement of said destination device.

The technology described herein recognises that in a system where data is transferred from a source device to a destination device via one or more buses, there will be some occasions when the latency associated with the transfer is a limiting factor on the performance of the system. At other times the latency may be less significant. Sometimes it may be important that data is processed by the destination device as soon as possible, where as on other occasions it may not matter as much when the data is processed. The present invention recognises that if a transfer is latency-critical, then it is particularly desirable that the time between the destination device receiving the data and the destination device being able to process the data is small. Thus, the present invention provides two modes of transmission for the data: a first mode of transmission and a second mode of transmission; wherein the latency between the destination device receiving the data and being able to process the data is smaller when the data is sent using the second mode than when the first mode is used. The mode of transmission is selected by transmission selection circuitry in dependence upon a mode selecting signal that indicates a latency requirement of the destination device. The first mode of transmission may have a particular advantage associated with it, but achieves this advantage at the expense of a delay in processing the data at the destination device. This delay could arise, for example, because the destination device converts the data from a form in which it is transmitted into a form suitable for processing. If the transfer is not latency-critical, then this delay may not matter, and so in this case the first mode is used. When latency has a greater impact on the performance of the system, the second mode is used allowing processing to begin more rapidly. Thus, the present invention allows for a trade-off between gaining the advantage associated with the first mode of transmission and reducing latency, and provides an improved bus data transfer technique that does not adversely affect latency.

The mode selecting signal could be generated within said destination device and transmitted to said transmission mode selecting circuitry and said source device by said destination device. This may be desirable, for example, if the destination device is a master device that controls a read transaction from a slave device to make the slave device provide the master with data via the buses. The master destination device could decide whether or not latency is important to that transfer of data, and provide the mode selecting signal indicating its latency requirements to the source device and transmission mode selecting circuitry.

Alternatively, the mode selecting signal could be generated within said source device and transmitted to said transmission mode selecting circuitry and said destination device by said source device. This may happen if the source device is a bus master and the destination device is a bus slave, the master controlling a data write to the slave. The source device would then send the mode selecting signal to the destination device so that the destination device will know what form the data will be in when it arrives and can then process it accordingly. The mode selecting signal sent to the destination could be in the form of sideband data sent via the bus.

Another option is that the mode selecting signal could be generated within said transmission mode selecting circuitry and transmitted to said source device and said destination device. The transmission mode selecting circuitry could act independently from the source and destination devices, e.g. it could form part of interconnect circuitry within an integrated circuit.

It is possible that there are a plurality of devices coupled to said one or more buses, and that at least one of the devices acts as a source device during some data transfers and a destination device during other data transfers. Indeed, it is likely that many devices will be capable of both sending data and receiving data.

The transmission mode selecting circuitry can be part of said source device. In this case, the transmission mode can be selected before sending the data via the one or more buses.

Alternatively, the transmission mode selecting circuitry can be part of an interconnect including said one or more buses. In this case, the transmission mode is selected once the data has been transferred to the buses and has left the source device.

Also, at least one of said source device and said destination device could be an interconnect including said one or more buses. It may be that different transmission modes can be used on different legs of a transfer via different buses. In this case, an interconnect could be a destination device for one part of the transfer, and a source device for a later part of the transfer. Alternatively, the transfer could be between two interconnects respectively acting as source and destination devices.

Furthermore, the mode selecting signal may be generated within an interconnect including said one or more buses in dependence upon the history of use of said interconnect. The interconnect could operate a quality of service scheme which dictates how rapidly certain master devices must be serviced. Thus, the interconnect could determine based on its previous transactions whether or not a transfer should be considered as latency-critical, and hence whether the first mode or second mode should be used for a particular transfer of data.

The mode selecting signal can be dependent upon the history of use of said destination device. Alternatively, the mode selecting signal can be dependent upon the history of use of said source device. Thus, the transmission mode selecting circuitry could select the transmission mode in dependence upon, say, how much time has passed since a device was last serviced by the buses, or how often the device has been serviced in a predetermined period of time.

The mode selecting signal could also be dependent upon the type of device of said destination device or the type of device of said source device. For example, some master devices could always be set as latency critical or non-latency critical. A processor is more likely to be latency-sensitive, whereas a video, audio or 3D graphics engine with an internal buffer may be less likely to be affected by increased latency. The mode selecting signal could be in the form of a master identification code that identifies the source or destination device.

It is possible that data can be transmitted via said one or more buses in a burst transfer. The mode selecting signal could be dependent upon the length or type of the burst transfer. For example, the latency at the destination device could be different for different lengths of burst transfer, and so the burst length might influence whether the first transmission mode or second transmission mode is selected.

Data being transferred could be associated with one of a plurality of memory address regions, where the mode selecting signal is dependent upon with which of said plurality of memory address regions said data is associated. The memory address regions could be regions of memory, or regions associated with a memory mapped device. In this way, the transmission mode can be selected in dependence upon where data is being transferred to or from.

For at least one of said plurality of memory address regions said mode selecting signal could indicate that the same one of said first transmission mode and said second transmission mode should always be used for sending data associated with said at least one of said plurality of memory address regions. Thus, memory address regions could be configured so that for some regions data is always sent with the first transmission mode, and for other regions data is always sent with the second transmission mode. For some regions, a preferred transmission mode may not be specified.

It is possible that one of said source device and said destination device is a master device and the other of said source device and said destination device is a slave device, and said mode selecting signal is dependent upon whether said data is being sent from master device to slave device or from slave device to master device.

The system will typically include master devices and slave devices. It will be appreciated that in general, master and slave devices could act as a source device in some transactions and as a destination device in other transactions. For a single data transfer, the flow of data will either be from master to slave or from slave to master. For example, a read transaction involves a transfer of data from a slave source device to a master destination device. A write transaction includes a transfer of data from a master source device to a slave destination device. The selected transmission mode could be dependent upon the direction of transfer across the bus (whether from master to slave or from slave to master). For example, there might be a situation where a read operation is considered to be more latency-critical than a write operation, since the data being read from the slave is required for some purpose by the master once the data has been returned. On other occasions the write transfer from master to slave may be considered more sensitive to increased latency.

In an embodiment, said data to be sent by said source device is a sequence of N-bit data words;

at least one of said one or more buses is an M-bit data bus configured to transmit M-bit data words, where N>M;

said apparatus further comprises resizing circuitry coupled to said M-bit bus and configured to convert between said sequence of N-bit data words and a corresponding sequence of M-bit data words that is transmitted on said M-bit bus;

said apparatus further comprises transmission reordering circuitry responsive to the transmission mode selected by said transmission mode selecting circuitry to selectively reorder data within said sequence of N-bit data words, such that corresponding-order portions of different N-bit data words are transmitted on said M-bit bus using a common portion of temporally adjacent M-bit data words;

in said first transmission mode said transmission reordering circuitry reorders the whole sequence of N-bit data words; and in said second transmission mode said transmission reordering circuitry does not reorder at least an initial portion of said sequence of N-bit data words.

One situation where the present technique is of particular advantage is when the data to be sent via the bus is a sequence of N-bit data words and at least one of the buses is an M-bit bus that is narrower than the N-bit data word size. Thus, when the N-bit data words are transferred via the M-bit bus they are sent in M-bit portions. A resizing circuitry is provided to convert between N-bit data words and M-bit data words. The power consumed by a bus depends upon the number of bits switching between successive data words transferred on the bus. The present technique recognises that corresponding-order portions of different N-bit data words are likely to have a higher degree of bit correlation. Thus, by using the first transmission mode to send these portions using a common portion of temporally adjacent M-bit data words on the M-bit bus, it is likely that the total number of bits switching during the entire sequence will be reduced compared to if the portions were not ordered. For example, if N=2M, then using the first transmission mode the high-order portions of each N-bit data word could be sent first, followed by the low-order portions of each N-bit data word. The present technique also recognises that if the entire sequence is reordered so that corresponding-order portions are grouped together, then this may cause a delay between the destination device receiving the data and being able to process the data. For example, if the high-order portions are sent before the low-order portions, the destination device would need to wait until all the high-order portions and the first low-order portion have arrived before being able to process the first data word of the sequence. In order to reduce this latency, the present technique provides a second transmission mode in which at least an initial portion of the sequence of N-bit data words is not reordered. Thus, the destination device can begin processing the data words in the initial portion while it is still receiving the remaining data words in the sequence. This reduces the overall latency in processing. Thus, this embodiment allows for a trade off between the power consumed by the system and the latency, depending on the requirements of the destination device. In the first transmission mode less power is consumed, but a greater delay in processing occurs. In the second mode the latency is smaller, but more power is consumed.

The initial portion that is not reordered can include the first N-bit data word in said sequence of N-bit data words. The remainder of the sequence of N-bit data words could then be ordered so that corresponding-order portions are sent together so as to reduce the average Hamming distance between successive transfers. Thus, the first word can be processed while the remainder are still being transferred. This provides a compromise between reducing the power consumed by the buses and reducing the latency at the destination.

Alternatively, the initial portion that is not reordered in the second mode of transmission could include all the N-bit data words in said sequence of N-bit data words. In some situations, it may be preferable that none of the N-bit data words are reordered so that the destination device does not need to put the received data words back in the original order so as to be able to process the data.

It is possible that said source device generates N-bit data words to be sent via said one or more buses; said source device is coupled to said M-bit bus; and said resizing circuitry and said transmission mode selecting circuitry are part of said source device.

When the source device is connected to a bus that is narrower than the size of the data words generated by the source device, then the resizing circuitry and transmission mode selecting circuitry can be made part of the source device. Thus, the N-bit data words can be converted into M-bit data words and reordered according to the selected transmission mode before leaving the source device and then transferred to the destination device via the buses.

Alternatively, the system could be arranged so that said source device is coupled to an N-bit bus and sends said sequence of N-bit data words on said N-bit bus; and said resizing circuitry is coupled to said N-bit bus and to said M-bit bus and converts between said sequence of N-bit data words transmitted on said N-bit bus and said corresponding sequence of M-bit data words transmitted on said M-bit bus.

If instead the source device is coupled to a bus that is of the same size as the N-bit data words to be sent to the destination, then the resizing circuitry can be provided to convert between M-bit data words and N-bit data words at the interface between the M-bit bus and N-bit bus.

When the resizing circuitry is provided between the M-bit and N-bit buses, said transmission mode selecting circuitry and transmission reordering circuitry could be part of said resizing circuitry and said resizing circuitry could be coupled to said source device and said destination device via said one or more buses. In this case, the transmission mode selection and data word reordering could also take place where the M-bit and N-bit buses meet.

Alternatively, the transmission mode selecting circuitry and transmission reordering circuitry could be part of the source device when the resizing circuitry is provided between the M-bit and N-bit buses. In this case the reordering of data within the N-bit data words could take place at the source device, and a new sequence of N-bit data words each containing a plurality of corresponding-order portions from successive data words in the original sequence could be sent over the N-bit bus. When the new sequence arrives at the resizing circuitry provided between the M-bit and N-bit buses then no reordering will need to take place, only resizing of the data words ready for transmission over the M-bit bus.

While the technology described herein can be used with a variety of source and destination devices, it can be particularly useful when one of said source device and said destination device is a memory, since memories are often associated with high capacitance data buses which are prone to high power consumption.

When one of the source device and destination device is a memory, it can be advantageous to provide the transmission mode selecting circuitry, resizing circuitry and transmission reordering circuitry as part of a memory controller coupled to the memory.

The technology described herein can be particularly useful when the source device is part of a different integrated circuit to said destination device, since off-chip buses will tend to consume more power than on-chip buses. For example, in a typical present day system driving the memory bus for an off-chip memory subsystem might account for 15-30% of the overall power consumed by the system.

Nevertheless, it will be appreciated that the present technique also has an advantage in on-chip systems where said source device and said destination device are part of the same integrated circuit.

In another example embodiment, in said first transmission mode said data is sent in a compressed form, and in said second transmission mode at least an initial portion of said data is sent in an uncompressed form.

This embodiment provides a balance between the bus bandwidth associated with the transfer and the latency associated with the system. In the first transmission mode, the data is compressed so that less bandwidth is needed on the buses. This frees up bandwidth for other data transfers. However, the destination device will need to restore the data to its uncompressed form before being able to process it. Hence, the second mode of transmission is provided where at least an initial portion of the data is transferred in an uncompressed form, so that the destination device can begin processing this data as soon as it is received. The destination device can then receive the remaining data while processing the initial portion. The transmission mode can be selected depending on the destination device's latency requirements.

In a further embodiment in the first transmission mode said data is sent in an encrypted form, and in said second transmission mode at least an initial portion of said data is sent in an unencrypted form.

This embodiment the balances the need for security of the transferred data against the latency at the destination. If latency is not as important as data security, then the first transmission mode could be used and all the data could be sent in the encrypted form. If security is not such an issue, then at least an initial portion could be sent unencrypted so that the destination device could begin processing this more rapidly. The remainder could be sent in an encrypted form. One application of this technique may be if the data to be transferred is video data. The owner of the data may feel that it is not so important that an unauthorised user could obtain the first few frames of data, since they would not be able to watch the remaining data which is encrypted. However, by sending the first few frames unencrypted this could avoid a delay between receiving and processing the data.

Viewed from another aspect, the technology described herein provides an apparatus for processing data, said apparatus comprising:

one or more bus means for transmitting data;

source means coupled to at least one of said one or more bus means and being for sending data via said one or more bus means;

destination means coupled to said source means via said one or more bus means and being for receiving and for processing said data; and transmission mode selecting means coupled to at least one of said source means and said one or more bus means and being for selecting one of a first transmission mode for said data and a second transmission mode for said data in response to a mode selecting signal, said second transmission mode having a lower latency between said destination means receiving said data and being able to process said data than said first transmission mode;

wherein said mode selecting signal is indicative of a latency requirement of said destination means.

Viewed from a further aspect, the technology described herein provides a method for processing data, said method comprising the steps of:

sending data from a source device via one or more buses, at least one of said one or more buses being coupled to said source device;

selecting one of a first transmission mode for said data and a second transmission mode for said data in response to a mode selecting signal;

receiving and processing said data with a destination device coupled to said source device via said one or more buses; wherein said mode selecting signal is indicative of a latency requirement of said destination device; and said second transmission mode has a lower latency between said destination device receiving said data and being able to process said data than said first transmission mode.

Viewed from yet another aspect, the technology described herein provides an apparatus for processing data, said apparatus comprising:

one or more buses for transmitting data, at least one of said one or more buses being an M-bit bus configured to transmit M-bit data words;

a source device coupled to at least one of said one or more buses and configured to send data via said one or more buses, said data being a sequence of N-bit data words, where N>M;

a destination device coupled to said source device via said one or more buses and configured to receive and to process said data;

resizing circuitry coupled to said M-bit bus and configured to convert between said sequence of N-bit data words and a corresponding sequence of M-bit data words that is transmitted on said M-bit bus;

transmission mode selecting circuitry coupled to at least one of said source device and said one or more buses and responsive to a mode selecting signal indicative of a latency requirement of said destination device to select one of a first transmission mode for said data and a second transmission mode for said data; and transmission reordering circuitry responsive to the transmission mode selected by said transmission mode selecting circuitry to selectively reorder data within said sequence of N-bit data words, such that corresponding-order portions of different N-bit data words are transmitted on said M-bit bus using a common portion of temporally adjacent M-bit data words; wherein:

in said first transmission mode said transmission reordering circuitry reorders the whole sequence of N-bit data words; and in said second transmission mode said transmission reordering circuitry does not reorder at least an initial portion of said sequence of N-bit data words.

Viewed from another aspect, the technology described herein provides a method for processing data, said method comprising the steps of:

sending data from a source device via one or more buses, at least one of said one or more buses being an M-bit bus for transmitting M-bit data words and said data being a sequence of N-bit data words, where N>M;

selecting one of a first transmission mode for said data and a second transmission mode for said data in response to a mode selecting signal;

converting between said sequence of N-bit data words and a corresponding sequence of M-bit data words that is transmitted on said M-bit bus;

selectively reordering data within said sequence of N-bit data words in response to the transmission mode selected in said selecting step, such that corresponding-order portions of different N-bit data words are transmitted on said M-bit bus using a common portion of temporally adjacent M-bit data words; and receiving and processing said data with a destination device coupled to said source device via said one or more buses; wherein:

said mode selecting signal is indicative of a latency requirement of said destination device;

in said first transmission mode said transmission reordering circuitry reorders the whole sequence of N-bit data words; and in said second transmission mode said transmission reordering circuitry does not reorder at least an initial portion of said sequence of N-bit data words.

Viewed from a further aspect, the technology described herein provides an apparatus for processing data, said apparatus comprising:

one or more bus means for transmitting data, at least one of said one or more bus means being an M-bit bus means for transmitting M-bit data words;

source means coupled to at least one of said one or more bus means and being for sending data via said one or more bus means, said data being a sequence of N-bit data words, where N>M;

destination means coupled to said source means via said one or more bus means and being for receiving and processing said data;

resizing means coupled to said M-bit bus means and configured to convert between said sequence of N-bit data words and a corresponding sequence of M-bit data words that is transmitted on said M-bit bus means;

transmission mode selecting means coupled to at least one of said source means and said one or more bus means and responsive to a mode selecting signal indicative of a latency requirement of said destination means to select one of a first transmission mode for said data and a second transmission mode for said data; and transmission reordering means responsive to the transmission mode selected by said transmission mode selecting means to selectively reorder data within said sequence of N-bit data words, such that corresponding-order portions of different N-bit data words are transmitted on said M-bit bus means using a common portion of temporally adjacent M-bit data words; wherein:

in said first transmission mode said transmission reordering means reorders the whole sequence of N-bit data words; and in said second transmission mode said transmission reordering means does not reorder at least an initial portion of said sequence of N-bit data words.

The above, and other objects, features and advantages will be apparent from the following detailed description of illustrative embodiments which is to be read in connection with the accompanying drawings.

BRIEF DESCRIPTION OF THE DRAWINGS

Embodiments will now be described, by way of example only, with reference to the accompanying drawings in which.

DESCRIPTION OF THE PREFERRED EMBODIMENTS

Figure 1:
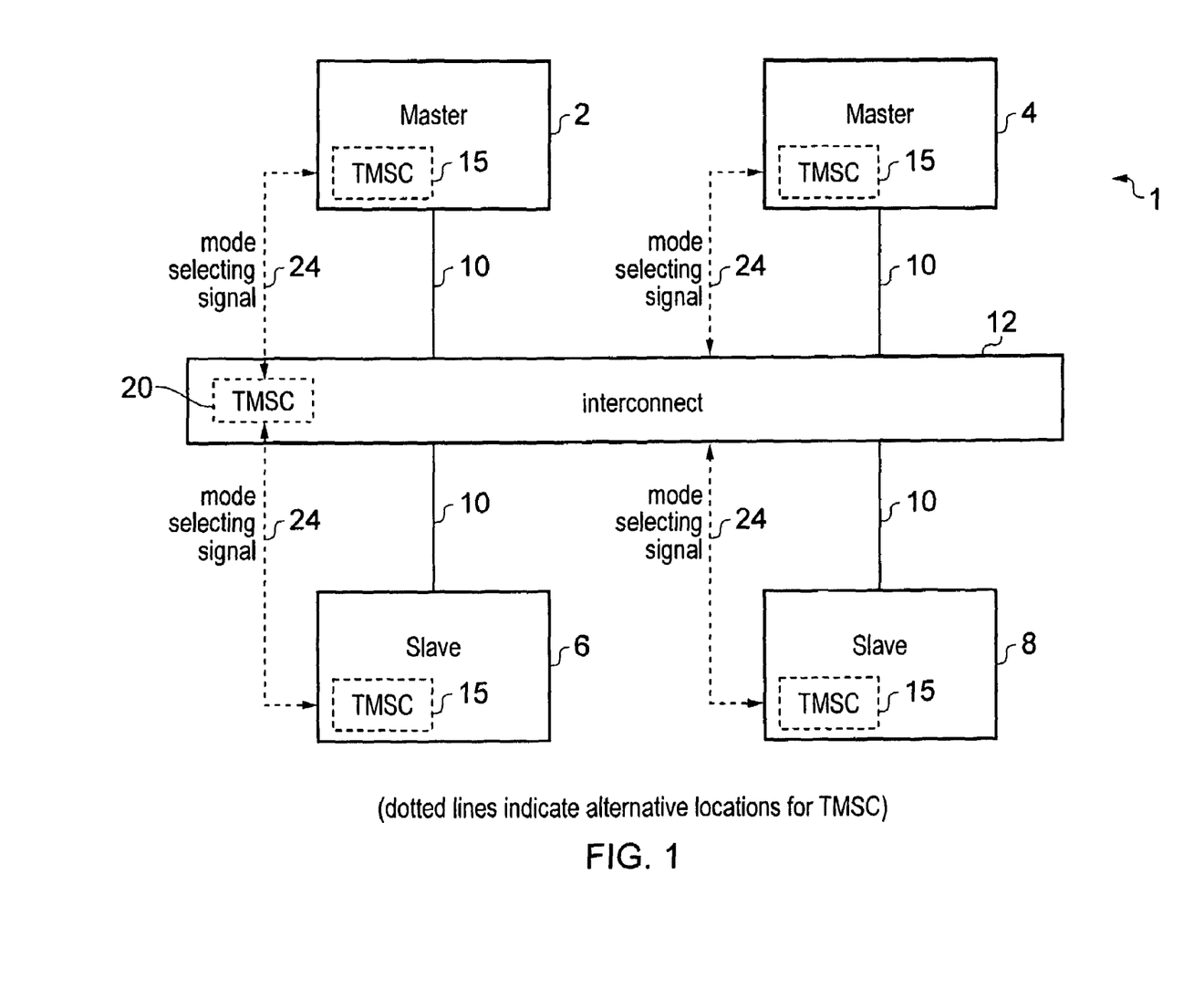
FIG. 1 schematically illustrates a data processing system including master devices and slave devices connected via a bus system.

FIG. 1 schematically illustrates a data processing system 1. The system 1 includes master devices 2 and 4 and slave devices 6 and 8. The master and slave devices 2, 4, 6 and 8 are connected via a system of buses. The system of buses includes bus lines 10 and an interconnect 12. In FIG. 1, master devices 2 and 4 and slave devices 6 and 8 can each act as a source device for sending data via the buses in some data transfers and a destination device for receiving data via the buses in other data transfers. However, it will be appreciated that it is possible that a master device or slave device could be exclusively for sending data or receiving data. For any particular transfer data is sent from a source device of the devices 2, 4, 6, 8 to a destination device of the devices 2, 4, 6, 8. The interconnect 12 could also act as a source or a destination device, for example if different transmission modes are used for different parts of the bus system. It will be appreciated that the system 1 could contain other components that are not illustrated in FIG. 1. It will also be appreciated that the system 1 need not necessarily include two master devices 2, 4 and two slave devices 6, 8 and that the present technique is equally applicable to systems where a single master device is connected to a single slave device via a bus.

A data transfer can be considered to be latency sensitive or latency insensitive. Data can be sent via the buses 10 according to one of a first transmission mode or a second transmission mode. When the second transmission mode is used, the destination device has a smaller delay between receiving data and being able to process the data than the first mode. Thus, latency sensitive transfers are sent using the second transmission mode, and transfers that are not latency sensitive are sent using the first transmission mode. Particular examples of the first and second transmission modes will be discussed hereafter with reference to FIGS. 3, 5 and 6. The transmission mode to be used is selected by transmission mode selecting circuitry 15 or 20 (TMSC). The boxes outlined with dotted lines 15, 20 in FIG. 1 indicate alternative positions for the transmission mode selecting circuitry. The transmission mode selecting circuitry could be provided as part of the master devices 2, 4 and slave devices 6, 8 in position 15 in FIG. 1. In this case the device acting as a source device would select a transmission mode before sending the data via the buses 10. Alternatively, transmission mode selecting circuitry 20 could be provided within the interconnect 12. In this case, the transmission mode could be selected once the data has been sent to the bus system.

The transmission mode selecting circuitry 15 or 20 selects either the first transmission mode or the second transmission mode depending on the value of a mode selecting signal. The mode selecting signal indicates a latency requirement of the destination device for a particular data transfer. Thus, if the latency requirement of the destination demands that a low latency mode should be used, then the second mode is selected, while in other cases the first mode of transmission is used. The mode selecting signal could be generated in any one of the devices 2, 4, 6, 8, the interconnect 12 and the transmission mode selecting circuitry 15 or 20. Once it has been generated, the mode selecting signal is sent to other devices involved in the data transfer and/or to the interconnect 12, so that these components of the system 1 can identify what transmission mode is going to be used to transfer the data. The mode selecting signal could be passed to other devices using the buses 10, (e.g. as a sideband signal) or could be sent using a signal line 24 that is separate from the buses 10.

The mode selecting signal could be set in dependence upon different criteria. For example, the signal could be dependent upon the history of use of the source device or destination device. In this case, the system could be arranged so that if a particular device has not been serviced by the bus system for a predetermined period of time, then the next transfer to or from that device is set to be latency-critical. Alternatively, the mode selecting signal could be set depending on the history of use of the interconnect 12.

Alternatively, the mode selecting signal could be set depending on the type of source device or type of destination device. For example, a processor could be set to always use the second, latency-critical mode of transmission, whereas a graphics processor could be set as always non-latency critical. In this case, the mode selecting signal could be in the form of a master ID which is used by the transmission mode selection circuitry 15 or 20 to select which mode of transmission is used to send the data.

Data is often transferred in bursts to improve the efficiency of transfer. A burst transfer consists of a series of consecutive transfers of data words across the buses. It is possible that the mode of transmission could be selected depending upon the length or type of burst transfer. For example, if the burst length is greater than a predetermined length, then one mode could be used, whereas the other mode might be more useful if the burst length is shorter than the predetermined length.

Another option is that data is associated with one of several memory address space regions. For some of these regions a preferred transmission mode could be specified so that the same transmission mode is always used for sending data associated with a particular region. For other regions the transmission mode could be unspecified. The memory address space regions could be regions within a memory or regions associated with a memory-mapped device.

The mode selecting signal could also be set in dependence upon on the direction of transfer (whether data is being sent from master device to slave device or from slave device to master device).

Figure 2:
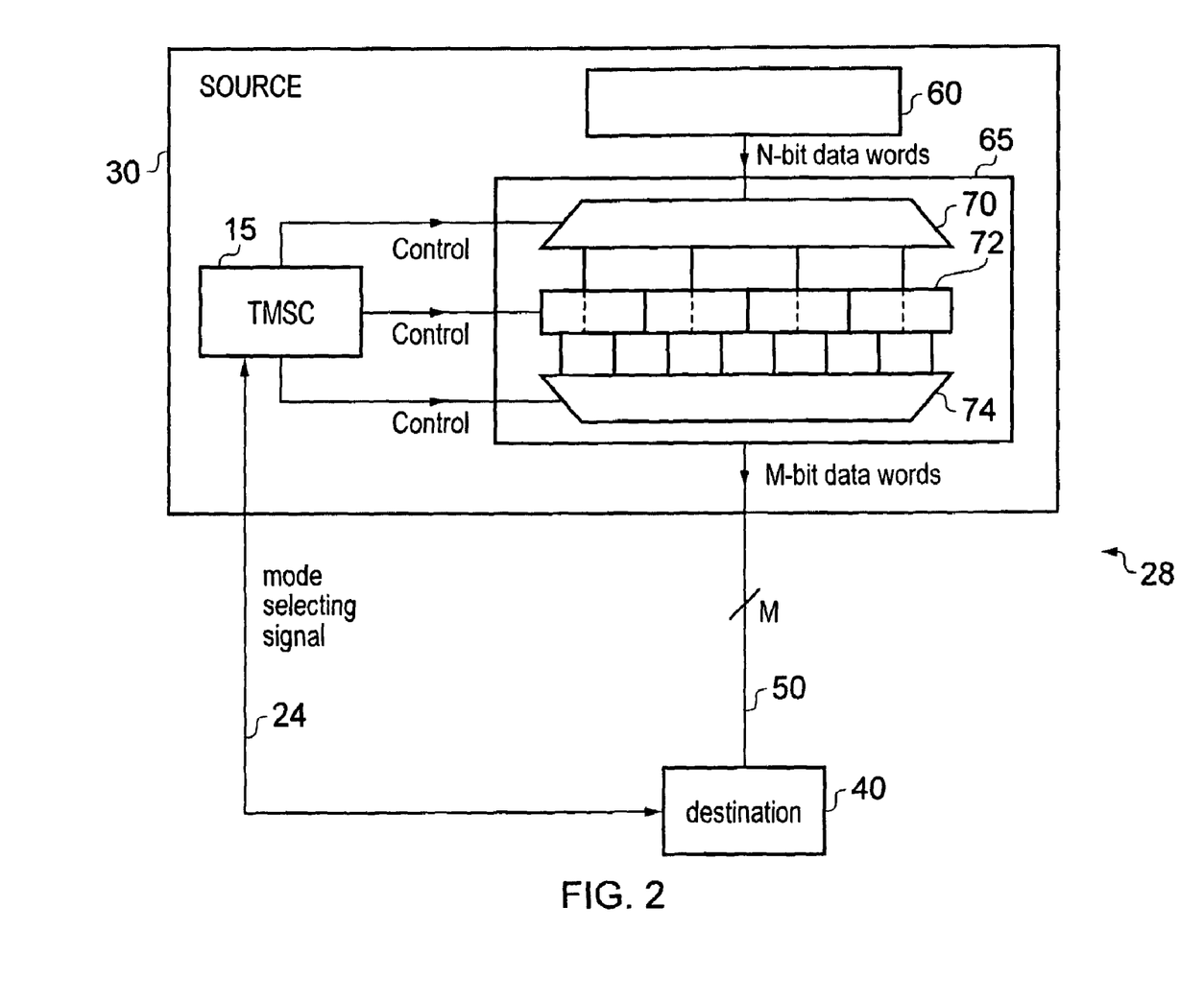
FIG. 2 illustrates a source device and a destination device that are coupled via an M-bit data bus.

FIG. 2 illustrates an example system 28 in which the is particularly useful. Elements of FIG. 2 that are the same as in FIG. 1 have been labelled with the same reference numerals. FIG. 2 shows a source device 30 that is connected to a destination device 40 via an M-bit data bus 50. Either the source device 30 or the destination device 40 could be a master device for this transaction, the other device being a slave device. It will be appreciated that the example system 28 could contain more devices, buses or interconnects, but that these have been omitted for simplicity. The source device 30 includes circuitry 60 that produces N-bit data words. The circuitry 60 could be, for example, an arithmetic logic unit that generates N-bit data, or a register bank from which N-bit data words can be fetched. N and M are both integers, and N is larger than M. Although N could be any multiple of M, in this particular example N=2M. Since the circuitry 60 in the source device 30 produces N-bit data words that are wider than the width of the M-bit bus 50, resizing/reordering circuitry 65 is provided within the source device 30 to convert between N-bit data words and M-bit data words to be transferred to the destination device 40 via the M-bit bus 50. The resizing/reordering circuitry 65 is also able to selectively reorder the data within a sequence of N-bit data words generated by the circuitry 60 so as to produce an ordered sequence of M-bit data words that are to be transmitted on the M-bit bus 50.

In the resizing/reordering circuitry 65, data words from the N-bit bus are received at a multiplexer 70 and stored within respective parts of a buffer 72 having a capacity of 4N bits. It will be appreciated that the capacity of buffer 72 is not restricted to 4N bits and will be dependent upon the length of a sequence of N-bit data words to be sent as a data burst and/or the relationship between M and N. The buffer 72 can be considered to form a swing buffer arrangement with successive data words from the N-bit data bus being written into respective parts of the buffer 72. A multiplexer 74 then reads M-bit portions of the data stored within the buffer 72 and drives these out on the M-bit data bus 50. The multiplexers 70 and 74 are switched by the transmission mode selecting circuitry 15, provided within the source device 30. It will be appreciated that by appropriately selecting the M-bit portion to be read out from the buffer 72, the order of the sequence of data being driven out on the M-bit bus 50 can be changed such that bit-value correlated portions of the original N-bit data words are be driven out on successive cycles of the M-bit bus, thereby reducing the average Hamming distance between those successive M-bit data words. As an example, when four N-bit data words have been written into the buffer 72, the high order M-bit portions of those data words can be read out upon successive cycles of the M-bit bus 50 and driven to the destination device 40.

In the example system 28, the order in which the M-bit portions are transmitted on the M-bit bus 50 is dependent upon the transmission mode selected by the transmission mode selecting circuitry 15 in accordance with the mode selecting signal. The mode selecting signal could be generated either by the source device 30 or the destination device 40 and could be sent via signal line 24 or via the bus 50.

Figure 3A:
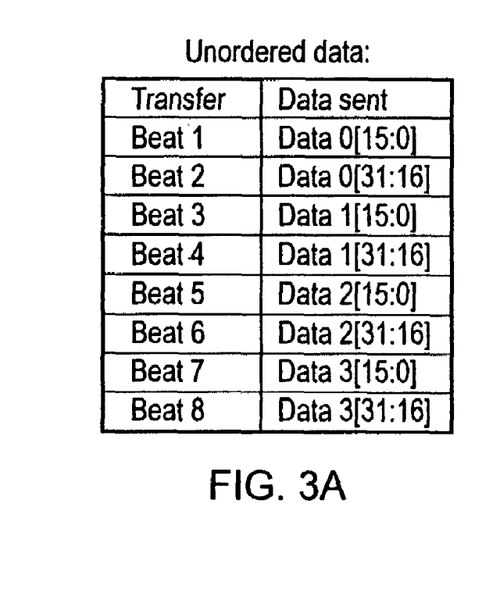
FIG. 3A illustrates an unordered sequence of data to be sent via a bus.
Figure 3B:
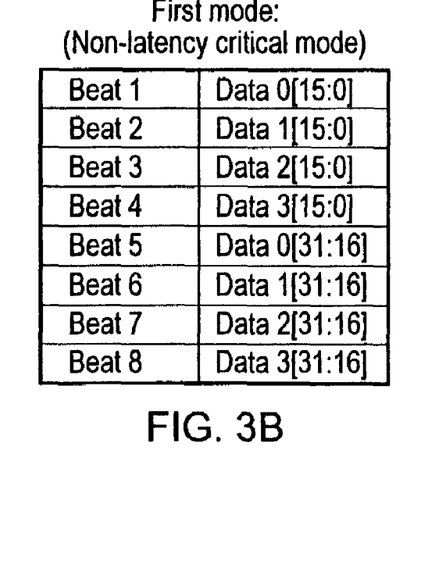
FIG. 3B illustrates an example of a first mode of transmission.
Figure 3C:
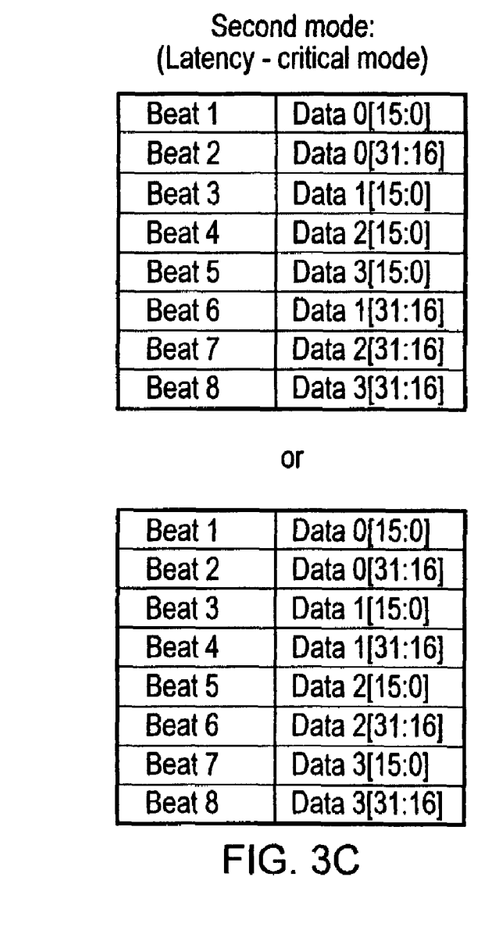
FIG. 3C illustrates examples of a second mode of transmission.

FIGS. 3A to 3C illustrate different transmission modes that may be used in the example system 28. FIGS. 3A to 3C illustrate the example where a burst of four data words is sent from the source device to the destination device, and where N=32 and M=16. It will be appreciated that the technique illustrated here is not restricted to these values of N and M or to a burst length of four data words.

FIG. 3A shows the order in which data would be sent if no reordering was performed by the resizing/reordering circuitry 65. Four 32-bit words of data are generated by the circuitry 60. If the data was transmitted on the M-bit bus in the order in which they are generated, then this would result in the data transfers shown in FIG. 3A, where each of the data words 0 to 3 are sent in sequence, the lower-order portion [15:0] followed by the higher-order portion [31:16] for each data word.

It is likely that the data words will show bit-correlation between corresponding-order portions of data words. For example, many data values will be much smaller than the maximum value possible for that number of bits, and so it is possible that many of the values have a number of leading "0"s or "1"s, depending on the sign convention. Alternatively if the data being sent is a program instruction, then for a burst of instructions the opcode of different instructions may be at least partially bit-correlated. Another example is pixel data from an image, where neighbouring pixels are likely to be correlated. If bit-correlation between different N-bit data words is present, then the number of bits switching between successive words sent on the M-bit bus can be reduced by sending corresponding-order portions of the N-bit data words in a portion of adjacent M-bit words. By reducing the total number of bits switching (i.e. the average Hamming distance associated with the transfer), the power consumed by the system can be reduced. Thus, when the first mode of transmission is selected by the transmission mode selecting circuitry 15 the data can be sent in the order illustrated in FIG. 3B. Here, the low-order portions of all the data words in the sequence are sent first, followed by the high-order portions of the data words. This helps to exploit the bit-correlation between high-order portions. It will be appreciated that the present technique is not restricted to the order shown in FIG. 3B and that alternative orders could be used depending upon the type of data being sent. This may be particularly useful if the data words each contain a plurality of data elements.

However, when the data is sent in the order shown in FIG. 3B, the destination device 40 must wait until it has received a full data word (i.e. until after Beat 5) before it can process the data being sent via the bus 50. This means there will be an increased delay in processing the data compared to the unordered case shown in FIG. 3A. On some occasions when a destination device is particularly sensitive to latency this may be unacceptable. In this case, the mode selecting signal can be set so that the transmission mode selecting circuitry 15 chooses a second transmission mode illustrated in FIG. 3C.

The upper half of FIG. 3C shows a possible implementation of the second transmission mode in which the first word in the sequence is not reordered, but the remainder of the sequence of data words is reordered. In this case both halves of the first word are sent together, followed by the lower-order portions of all remaining data words, and finally the higher-order portions of the remaining data words. This means that the destination device 40 can start processing the first data word while it continues to receive the rest of the data. By the time the destination device 40 has finished processing the data then it is more likely to have received enough data to carry on processing. Alternatively, an initial portion of more than one data word could be transmitted without reordering.

The lower half of FIG. 3C shows an alternative second transmission mode in which the entire sequence of data is sent without reordering. Thus, there will be a shorter delay between the destination device 40 receiving the data and being able to process it.

Thus, the first and second modes of transmission provide different options that allow the performance of the system to be improved, while not adversely impacting the latency in processing. If latency is considered critical to the performance of the system, then the data can be sent with the second transmission mode shown in FIG. 3C. However, if latency is not likely to have an impact on the system performance, then power can be conserved by using the first transmission mode as illustrated in FIG. 3B.

The resizing/reordering circuitry 65 shown in FIG. 2 could also be used in systems where an interconnect has a data width that is different to the width of a bus connected to the interconnect.

Figure 4:
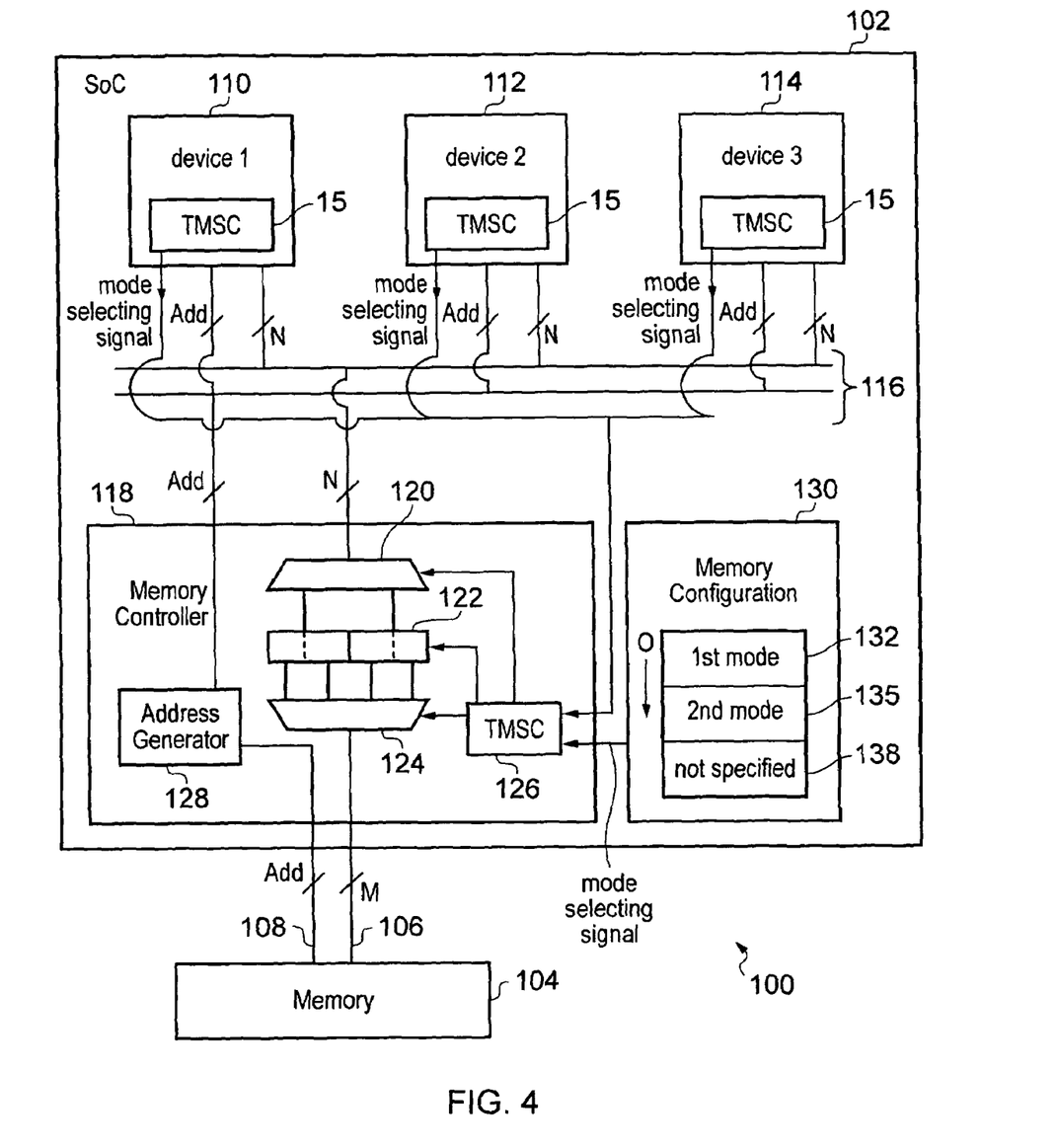
FIG. 4 shows a system-on-chip integrated circuit that is connected to an off-chip integrated circuit memory via an M-bit data bus.

FIG. 4 illustrates a second example system 100 that makes use of the present technique. The system 100 includes a system-on-chip integrated circuit 102 that is connected to an off-chip integrated circuit memory 104 via a memory bus having an M-bit data bus portion 106 and an address bus portion 108. The memory 104 could be, for example, a synchronous dynamic random access memory (SDRAM), a flash memory, a static random access memory (SRAM) etc. The integrated circuit 102 includes a first device 110, a second device 112 and a third device 114 all communicating via a common bus 116 which includes an N-bit data bus portion and an address bus portion. The devices include transmission mode selecting circuitry 15 as described with reference to FIG. 1. Also coupled to the common bus 116 is a memory controller 118. When one of the devices 110, 112, 114 wishes to write data to the memory 104, or read data from the memory 104, then this activity is performed via the memory controller 118. Each of the devices 110, 112, 114 and the memory 104 can act as either a source device or destination device.

In the second example system 100, the memory controller 118 includes resizing/reordering circuitry for converting between N-bit data words on the N-bit bus 116 and M-bit data words on the M-bit data bus 106 and reordering the data words using the technique shown in FIG. 3. Thus, the memory controller 118 includes multiplexers 120 and 124 and buffer 122 that behave in the same way as multiplexers 70 and 74 and buffer 72 in FIG. 2. The memory controller 118 also includes transmission mode selecting circuitry 126 that controls the resizing/reordering circuitry in accordance with the mode selecting signal. Thus, the mode of transmission on the M-bit bus is controlled by the memory controller 118 depending upon the latency requirements of the destination device.

The address values on the address bus 108 sent out to the memory 104 are chosen to properly reflect the original addresses associated with the N-bit data words and thus will be non-sequential due to the reordering performed. Alternatively, the data can be stored in a scrambled form with the memory 104 by sticking with an original address sequence, for example a supported wrapping or linear addressing scheme, and ensuring that the reverse reordering is performed by the multiplexers 124, 120 and the buffer 122 when reading data from the memory 104. An address generator 128 is provided within the memory controller 118 to generate the re-sequenced addresses when such re-sequenced addresses are being used.

A memory configuration controller 130 is provided in which data is held defining memory address space regions storing data elements of different inherent size. Thus, one or more memory address regions 132 may be configured so that the first mode of transmission is always used for data associated with that region. Some regions 135 could be set up to specify the second mode as the preferred transmission mode. For other regions 138 the preferred mode may not be specified. Thus, the mode selecting signal could be generated within the memory configuration controller 130 in dependence upon which of the memory address space regions the transmitted data is associated with and sent to the transmission mode selecting circuitry 126 within the memory controller 118.

Although in FIG. 4 the memory controller 118 is used to reorder data within a sequence of N-bit data words, it is also possible to perform reordering at the one of devices 110, 112, 114 and the memory 104 that is acting as the source device. In this case, data would be generated or read from memory 104 in the reordered sequence and the buffer 122 and multiplexers 120 and 124 used only to convert between N-bit words and M-bit words at the interface between the N-bit data bus 116 and the M-bit data bus 106.

Thus, the system 100 shown in FIG. 4 can select the first mode or the second mode of transmission in dependence upon the mode selecting signal to reduce the power consumed by the buses and/or reduce the latency at the destination device.

Figure 5:
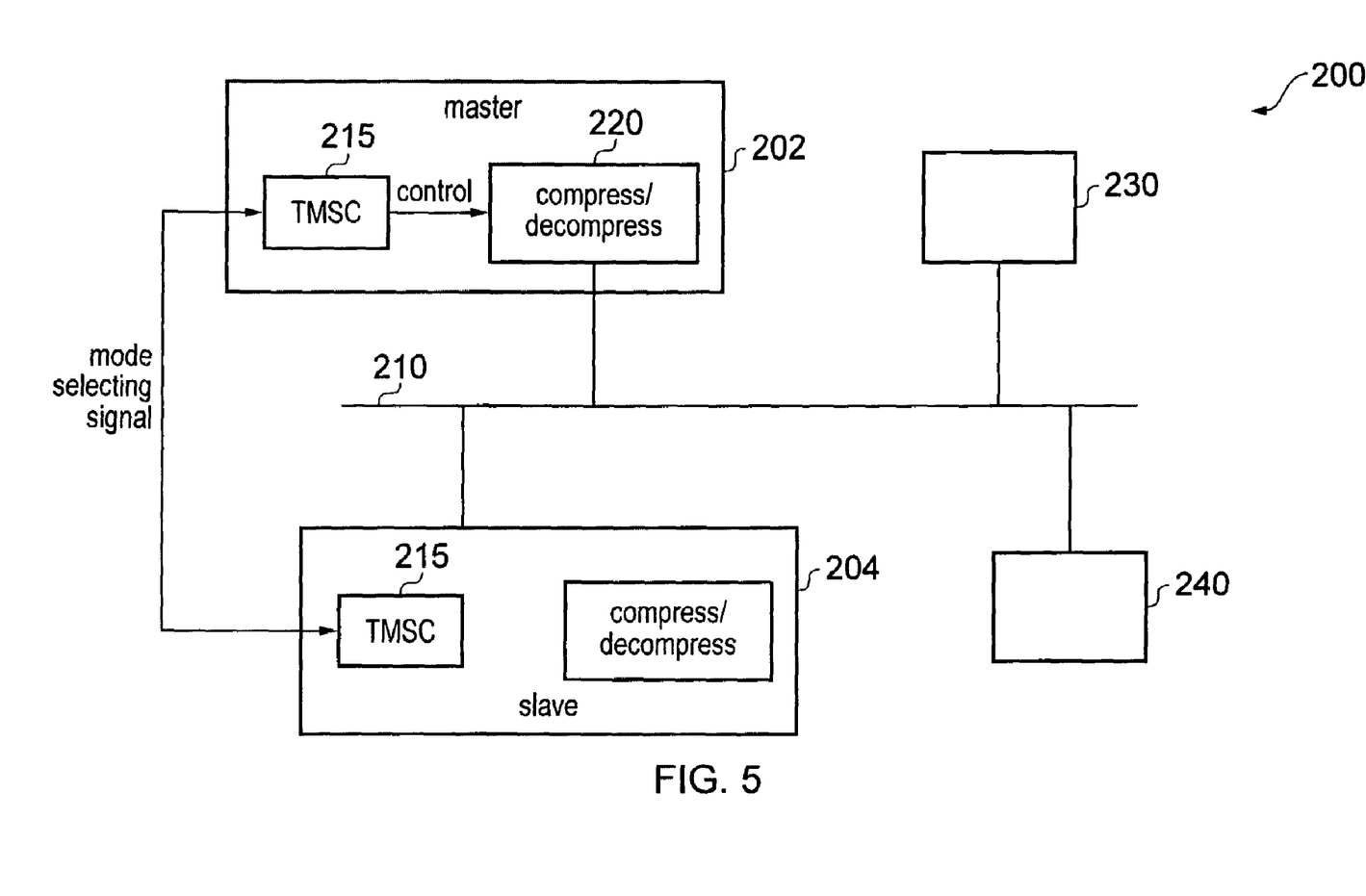
FIG. 5 shows an example system in which data to be transmitted over a bus can be selectively compressed.

FIG. 5 shows another example of a system 200. System 200 includes a master device 202 and a slave device 204 connected via a bus 210. For simplicity the bus 210 has been illustrated without an interconnect, but the bus system linking the two devices could equally well include an interconnect or more bus lines. The system 200 could also include more devices connected to the bus 210. The master device 202 and slave device 204 both have transmission mode selecting circuitry 215 that selects the transmission mode for transmission of data via the bus 210 in response to the mode selecting signal. Each device also includes compression/decompression circuitry 220 for transforming between data in a compressed form and data in an uncompressed form. The compression/decompression circuitry 220 is controlled by the transmission mode selecting circuitry 215 in dependence upon the selected transmission mode.

In the first, non-latency-critical, transmission mode, data being transferred via the bus 210 is compressed using the compression/decompression circuitry 220 of the source device so as to save on bandwidth on the bus. This will free up bandwidth on the bus that can be used by other devices 230, 240. However, compressing the data will also increase the delay before the destination device can process the data since the data must first be decompressed by the compression/decompression circuitry 220 of the destination device. Thus, in the second mode at least an initial portion of the data is sent in an uncompressed form so that the destination device can begin processing this portion, while the remaining data is sent in the compressed form. It is also possible that all the data could be sent in an uncompressed state in the second mode of transmission. By selecting the transmission mode based on the mode selecting signal indicating the requirements of the destination device, the present technique achieves a compromise between reducing the bandwidth on the bus and reducing the latency between the destination device receiving the data and processing the data.

Figure 6:
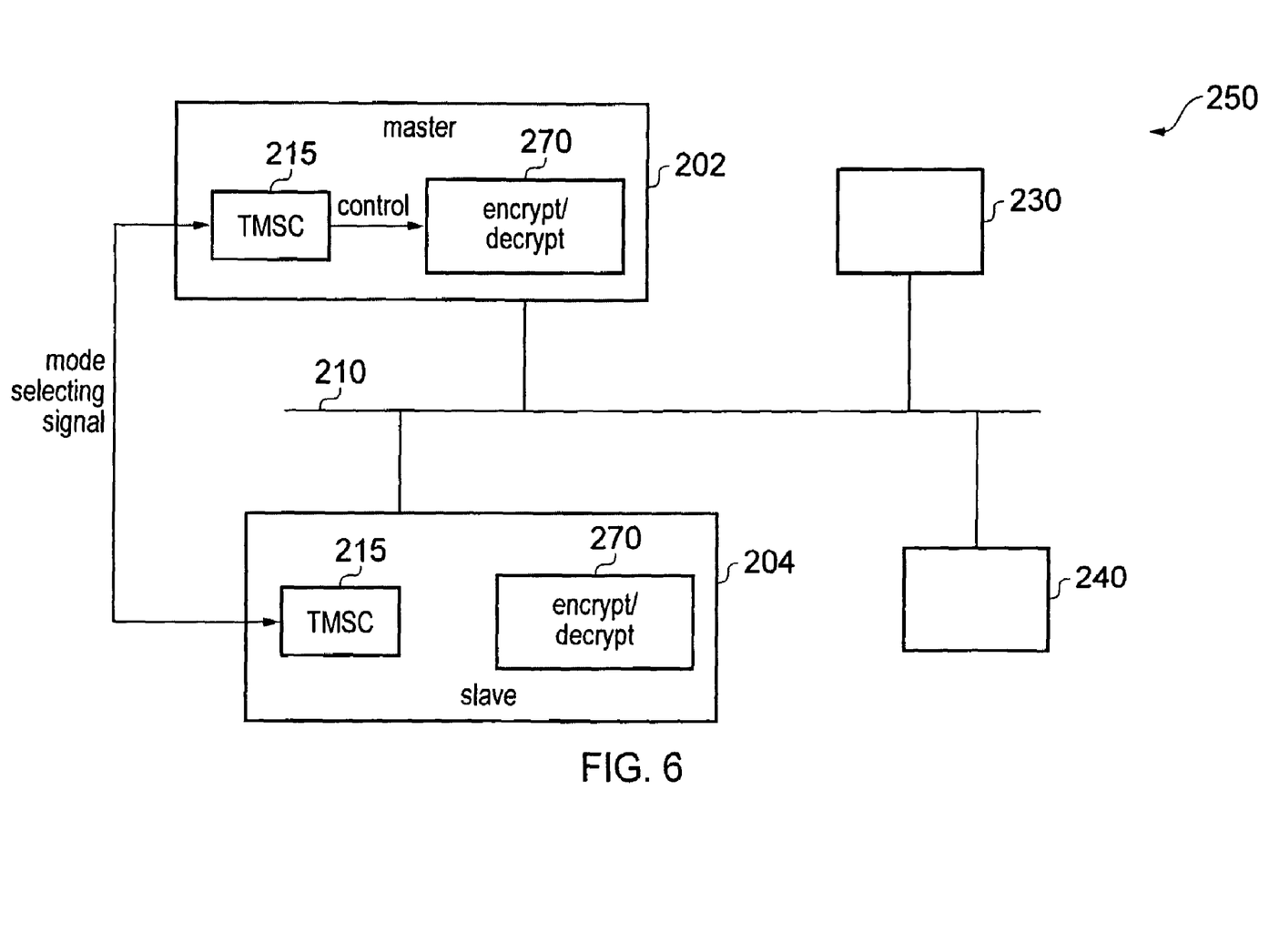
FIG. 6 shows an example system in which data to be transmitted over a bus can be selectively encrypted.

FIG. 6 shows yet another example system 250. This system is similar to the system 200 shown in FIG. 5, but where the compression/decompression circuitry 220 in the master device 202 and slave device 204 is replaced with encryption/decryption circuitry 270. To prevent unauthorised devices 230, 240 accessing the transmitted data, the data can be encrypted by the encryption/decryption circuitry 270 of the master device, sent via the bus 210, and decrypted by the encryption/decryption circuitry 270 of the destination device. In the first mode of transmission the security is highest and all data transmitted via the bus is encrypted. However, decrypting the data at the destination device will increase the processing latency, and so if security is not as important then the second mode of transmission can be used in which at least an initial portion of data is sent in an unencrypted form so as to reduce the latency at the destination device. One situation where this may be acceptable is when the data being transmitted is video data. The owner of the data may not mind the first few frames of data being in an unencrypted form so that processing can begin rapidly, since the unauthorised viewer will want to view more than the first few frames. The remainder of the video data could then be encrypted. Thus, the system 250 of FIG. 6 allows for a trade off between data security and processing latency.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. An apparatus for processing data, said apparatus comprising:
   one or more buses for transmitting data;
   a source device coupled to at least one of said one or more buses and configured to send data via said one or more buses;
   a destination device coupled to said source device via said one or more buses and configured to receive and to process said data; and
   transmission mode selecting circuitry coupled to at least one of said source device and said one or more buses and responsive to a mode selecting signal to select one of a first transmission mode for said data and a second transmission mode for said data, said second transmission mode having a lower latency between said destination device receiving said data and being able to process said data than said first transmission mode;
   wherein said mode selecting signal is indicative of a latency requirement of said destination device, and
   wherein said mode selecting signal is generated within said transmission mode selecting circuitry and transmitted to said source device and said destination device.

2. An apparatus according to claim 1, wherein said mode selecting signal is generated within said destination device and transmitted to said transmission mode selecting circuitry and said source device by said destination device.

3. An apparatus according to claim 1, wherein said mode selecting signal is generated within said source device and transmitted to said transmission mode selecting circuitry and said destination device by said source device.

4. An apparatus according to claim 1, wherein a plurality of devices are coupled to said one or more buses, and at least one of said plurality of devices acts as a source device during some data transfers and a destination device during other data transfers.

5. An apparatus according to claim 1, wherein said transmission mode selecting circuitry is part of an interconnect including said one or more buses.

6. An apparatus according to claim 1, wherein at least one of said source device and said destination device is an interconnect including said one or more buses.

7. An apparatus according to claim 1, wherein said mode selecting signal is dependent upon the history of use of said destination device.

8. An apparatus according to claim 1, wherein said mode selecting signal is dependent upon the history of use of said source device.

9. An apparatus according to claim 1, wherein said mode selecting signal is dependent upon the type of device of said destination device.

10. An apparatus according to claim 1, wherein said mode selecting signal is dependent upon the type of device of said source device.

11. An apparatus according to claim 1, wherein said data is transmitted via said one or more buses in a burst transfer.

12. An apparatus according to claim 11, wherein said mode selecting signal is dependent upon the length of said burst transfer.

13. An apparatus according to claim 11, wherein said mode selecting signal is dependent upon the type of said burst transfer.

14. An apparatus according to claim 1, wherein said data is associated with one of a plurality of memory address regions, and said mode selecting signal is dependent upon with which of said plurality of memory address regions said data is associated.

15. An apparatus according to claim 14, wherein for at least one of said plurality of memory address regions said mode selecting signal indicates that the same one of said first transmission mode and said second transmission mode should always be used for sending data associated with said at least one of said plurality of memory address regions.

16. An apparatus according to claim 1, wherein one of said source device and said destination device is a master device and the other of said source device and said destination device is a slave device, and said mode selecting signal is dependent upon whether said data is being sent from master device to slave device or from slave device to master device.

17. An apparatus according to claim 1, wherein:
   said data to be sent by said source device is a sequence of N-bit data words;
   at least one of said one or more buses is an M-bit data bus configured to transmit M-bit data words, where N>M;
   said apparatus further comprises resizing circuitry coupled to said M-bit bus and configured to convert between said sequence of N-bit data words and a corresponding sequence of M-bit data words that is transmitted on said M-bit bus;
   said apparatus further comprises transmission reordering circuitry responsive to the transmission mode selected by said transmission mode selecting circuitry to selectively reorder data within said sequence of N-bit data words, such that corresponding-order portions of different N-bit data words are transmitted on said M-bit bus using a common portion of temporally adjacent M-bit data words;

in said first transmission mode said transmission reordering circuitry reorders the whole sequence of N-bit data words; and in said second transmission mode said transmission reordering circuitry does not reorder at least an initial portion of said sequence of N-bit data words.

18. An apparatus according to claim 17, wherein said initial portion that is not reordered includes the first N-bit data word in said sequence of N-bit data words.

19. An apparatus according to claim 17, wherein said initial portion that is not reordered includes all the N-bit data words in said sequence of N-bit data words.

20. An apparatus according to claim 17, wherein:
said source device generates N-bit data words to be sent via said one or more buses;
said source device is coupled to said M-bit bus; and
said resizing circuitry and said transmission mode selecting circuitry are part of said source device.

21. An apparatus according to claim 17, wherein:
said source device is coupled to an N-bit bus and sends said sequence of N-bit data words on said N-bit bus; and
said resizing circuitry is coupled to said N-bit bus and to said M-bit bus and converts between said sequence of N-bit data words transmitted on said N-bit bus and said corresponding sequence of M-bit data words transmitted on said M-bit bus.

22. An apparatus according to claim 21, wherein said transmission mode selecting circuitry and said transmission reordering circuitry are part of said resizing circuitry and said resizing circuitry is coupled to said source device and said destination device via said one or more buses.

23. An apparatus according to claim 21, wherein said transmission mode selecting circuitry and said transmission reordering circuitry are part of said source device.

24. An apparatus according to claim 17, wherein one of said source device and said destination device is a memory.

25. An apparatus according to claim 24, further comprising a memory controller coupled to said memory, wherein said transmission mode selecting circuitry, said resizing circuitry and said transmission reordering circuitry are part of said memory controller.

26. An apparatus according to claim 1, wherein said source device is part of a different integrated circuit to said destination device.

27. An apparatus according to claim 1, wherein said source device and said destination device are part of the same integrated circuit.

28. An apparatus according to claim 1, wherein:
in said first transmission mode said data is sent in a compressed form, and in said second transmission mode at least an initial portion of said data is sent in an uncompressed form.

29. An apparatus according to claim 1, wherein in said first transmission mode said data is sent in an encrypted form, and in said second transmission mode at least an initial portion of said data is sent in an unencrypted form.

30. An apparatus for processing data, said apparatus comprising:
one or more buses for transmitting data;
a source device coupled to at least one of said one or more buses and configured to send data via said one or more buses;
a destination device coupled to said source device via said one or more buses and configured to receive and to process said data; and
transmission mode selecting circuitry coupled to at least one of said source device and said one or more buses and responsive to a mode selecting signal to select one of a first transmission mode for said data and a second transmission mode for said data, said second transmission mode having a lower latency between said destination device receiving said data and being able to process said data than said first transmission mode;
wherein said mode selecting signal is indicative of a latency requirement of said destination device and
wherein said transmission mode selecting circuitry is part of said source device.

31. An apparatus for processing data, said apparatus comprising:
one or more buses for transmitting data;
a source device coupled to at least one of said one or more buses and configured to send data via said one or more buses;
a destination device coupled to said source device via said one or more buses and configured to receive and to process said data; and
transmission mode selecting circuitry coupled to at least one of said source device and said one or more buses and responsive to a mode selecting signal to select one of a first transmission mode for said data and a second transmission mode for said data, said second transmission mode having a lower latency between said destination device receiving said data and being able to process said data than said first transmission mode;
wherein said mode selecting signal is indicative of a latency requirement of said destination device, and
wherein said mode selecting signal is generated within an interconnect including said one or more buses in dependence upon the history of use of said interconnect.

32. An apparatus for processing data, said apparatus comprising:
one or more bus means for transmitting data;
source means coupled to at least one of said one or more bus means and being for sending data via said one or more bus means;
destination means coupled to said source means via said one or more bus means and being for receiving and for processing said data; and
transmission mode selecting means coupled to at least one of said source means and said one or more bus means and being for selecting one of a first transmission mode for said data and a second transmission mode for said data in response to a mode selecting signal, said second transmission mode having a lower latency between said destination means receiving said data and being able to process said data than said first transmission mode;
wherein said mode selecting signal is indicative of a latency requirement of said destination means, and
wherein said mode selecting signal is generated within said transmission mode selecting means and transmitted to said source device and said destination device.

33. A method for processing data, said method comprising the steps of:
sending data from a source device via one or more buses, at least one of said one or more buses being coupled to said source device;
selecting one of a first transmission mode for said data and a second transmission mode for said data in response to a mode selecting signal;

receiving and processing said data with a destination device coupled to said source device via said one or more buses; wherein said mode selecting signal is indicative of a latency requirement of said destination device; and said second transmission mode has a lower latency between said destination device receiving said data and being able to process said data than said first transmission mode, wherein said mode selecting signal is generated within transmission mode selecting circuitry and transmitted to said source device and said destination device.

34. An apparatus for processing data, said apparatus comprising:

one or more buses for transmitting data, at least one of said one or more buses being an M-bit bus configured to transmit M-bit data words;

a source device coupled to at least one of said one or more buses and configured to send data via said one or more buses, said data being a sequence of N-bit data words, where N>M;

a destination device coupled to said source device via said one or more buses and configured to receive and to process said data;

resizing circuitry coupled to said M-bit bus and configured to convert between said sequence of N-bit data words and a corresponding sequence of M-bit data words that is transmitted on said M-bit bus;

transmission mode selecting circuitry coupled to at least one of said source device and said one or more buses and responsive to a mode selecting signal indicative of a latency requirement of said destination device to select one of a first transmission mode for said data and a second transmission mode for said data; and transmission reordering circuitry responsive to the transmission mode selected by said transmission mode selecting circuitry to selectively reorder data within said sequence of N-bit data words, such that corresponding-order portions of different N-bit data words are transmitted on said M-bit bus using a common portion of temporally adjacent M-bit data words; wherein:

in said first transmission mode said transmission reordering circuitry reorders the whole sequence of N-bit data words; and in said second transmission mode said transmission reordering circuitry does not reorder at least an initial portion of said sequence of N-bit data words.

35. A method for processing data, said method comprising the steps of:

sending data from a source device via one or more buses, at least one of said one or more buses being an M-bit bus for transmitting M-bit data words and said data being a sequence of N-bit data words, where N>M;

selecting one of a first transmission mode for said data and a second transmission mode for said data in response to a mode selecting signal;

converting between said sequence of N-bit data words and a corresponding sequence of M-bit data words that is transmitted on said M-bit bus;

selectively reordering data within said sequence of N-bit data words in response to the transmission mode selected in said selecting step, such that corresponding-order portions of different N-bit data words are transmitted on said M-bit bus using a common portion of temporally adjacent M-bit data words; and receiving and processing said data with a destination device coupled to said source device via said one or more buses; wherein:

said mode selecting signal is indicative of a latency requirement of said destination device;

in said first transmission mode said transmission reordering circuitry reorders the whole sequence of N-bit data words; and in said second transmission mode said transmission reordering circuitry does not reorder at least an initial portion of said sequence of N-bit data words.

36. An apparatus for processing data, said apparatus comprising:

one or more bus means for transmitting data, at least one of said one or more bus means being an M-bit bus means for transmitting M-bit data words;

source means coupled to at least one of said one or more bus means and being for sending data via said one or more bus means, said data being a sequence of N-bit data words, where N>M;

destination means coupled to said source means via said one or more bus means and being for receiving and processing said data;

resizing means coupled to said M-bit bus means and configured to convert between said sequence of N-bit data words and a corresponding sequence of M-bit data words that is transmitted on said M-bit bus means;

transmission mode selecting means coupled to at least one of said source means and said one or more bus means and responsive to a mode selecting signal indicative of a latency requirement of said destination means to select one of a first transmission mode for said data and a second transmission mode for said data; and transmission reordering means responsive to the transmission mode selected by said transmission mode selecting means to selectively reorder data within said sequence of N-bit data words, such that corresponding-order portions of different N-bit data words are transmitted on said M-bit bus means using a common portion of temporally adjacent M-bit data words; wherein in said first transmission mode said transmission reordering means reorders the whole sequence of N-bit data words; and in said second transmission mode said transmission reordering means does not reorder at least an initial portion of said sequence of N-bit data words.

37. An apparatus for processing data, said apparatus comprising:

one or more bus means for transmitting data;

source means coupled to at least one of said one or more bus means and being for sending data via said one or more bus means;

destination means coupled to said source means via said one or more bus means and being for receiving and for processing said data; and transmission mode selecting means coupled to at least one of said source means and said one or more bus means and being for selecting one of a first transmission mode for said data and a second transmission mode for said data in response to a mode selecting signal, said second transmission mode having a lower latency between said destination means receiving said data and being able to process said data than said first transmission mode;

wherein said mode selecting signal is indicative of a latency requirement of said destination means, and wherein said transmission mode selecting means is part of said source means.

38. An apparatus for processing data, said apparatus comprising:

one or more bus means for transmitting data;

source means coupled to at least one of said one or more bus means and being for sending data via said one or more bus means;

destination means coupled to said source means via said one or more bus means and being for receiving and for processing said data; and transmission mode selecting means coupled to at least one of said source means and said one or more bus means and being for selecting one of a first transmission mode for said data and a second transmission mode for said data in response to a mode selecting signal, said second transmission mode having a lower latency between said destination means receiving said data and being able to process said data than said first transmission mode;

wherein said mode selecting signal is indicative of a latency requirement of said destination means, and wherein said mode selecting signal is generated within interconnect means including said one or more bus means in dependence upon the history of use of said interconnect means.

39. A method for processing data, said method comprising the steps of:

sending data from a source device via one or more buses, at least one of said one or more buses being coupled to said source device;

selecting transmission mode selecting circuitry forming part of said source device one of a first transmission mode for said data and a second transmission mode for said data in response to a mode selecting signal;

receiving and processing said data with a destination device coupled to said source device via said one or more buses; wherein said mode selecting signal is indicative of a latency requirement of said destination device; and said second transmission mode has a lower latency between said destination device receiving said data and being able to process said data than said first transmission mode.

40. A method for processing data, said method comprising the steps of:

sending data from a source device via one or more buses, at least one of said one or more buses being coupled to said source device;

generating a mode selecting signal within an interconnect including said one or more buses in dependence upon the history of use of said interconnect;

selecting one of a first transmission mode for said data and a second transmission mode for said data in response to a mode selecting signal;

receiving and processing said data with a destination device coupled to said source device via said one or more buses; wherein said mode selecting signal is indicative of a latency requirement of said destination device; and said second transmission mode has a lower latency between said destination device receiving said data and being able to process said data than said first transmission mode.

* * * * *